United States Patent
Yokota

(10) Patent No.: US 10,897,543 B2
(45) Date of Patent: Jan. 19, 2021

(54) IMAGE FORMING APPARATUS AND METHOD OF CONTROLLING IMAGE FORMING APPARATUS

(71) Applicant: KYOCERA Document Solutions Inc., Osaka (JP)

(72) Inventor: Hiroshi Yokota, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/751,978

(22) Filed: Jan. 24, 2020

(65) Prior Publication Data
US 2020/0244818 A1 Jul. 30, 2020

(30) Foreign Application Priority Data
Jan. 30, 2019 (JP) .................. 2019-014250

(51) Int. Cl.
H04N 1/04 (2006.01)
H04N 1/00 (2006.01)
B41J 2/21 (2006.01)

(52) U.S. Cl.
CPC ........ H04N 1/00045 (2013.01); B41J 2/2132 (2013.01); H04N 1/00005 (2013.01)

(58) Field of Classification Search
CPC ............ H04N 1/00045; H04N 1/00005; B41J 2/2132
USPC ................................. 358/1.14, 3.26
See application file for complete search history.

(56) References Cited

U.S. PATENT DOCUMENTS

| 9,571,670 B2 * | 2/2017 | Ooyanagi | H04N 1/00063 |
| 2013/0195474 A1 * | 8/2013 | Miyamoto | G03G 15/70 399/19 |
| 2020/0167101 A1 * | 5/2020 | Yamamoto | B41J 11/0095 |

FOREIGN PATENT DOCUMENTS

JP  2003-330334 A  11/2003

* cited by examiner

*Primary Examiner* — Cheukfan Lee
(74) *Attorney, Agent, or Firm* — Stein IP, LLC

(57) ABSTRACT

A sheet reader reads the entire sheet which is transported. Based on the reading, a controller generates region classification image data for distinguishing between a region of the sheet and a region other than the sheet. The controller performs comparison processing in which reference image data that is the region classification image data of a first sheet in a print job and comparison target image data that is the region classification image data for another sheet are compared. The controller determines whether or not a sheet corresponding to the comparison target image data is abnormal.

8 Claims, 8 Drawing Sheets

IMAGE FORMING APPARATUS AND METHOD OF CONTROLLING IMAGE FORMING APPARATUS

This application is based upon and claims the benefit of priority from the corresponding Japanese Patent Application No. 2019-014250 filed on Jan. 30, 2019, the entire contents of which are incorporated herein by reference.

BACKGROUND

The present disclosure relates to an image forming apparatus which reads a sheet that is transported.

An mage forming apparatus prints a sheet which is transported. When the position of the sheet which is transported is displaced, the position of a print image within the sheet is displaced. As a technology on the displacement of the position (position in which an image is recorded) of a print image, the following technology is known.

An image forming apparatus is known in which an image is formed on a sheet that is passed from a sheet storage portion through a feed path so as to be transported, in which a plurality of reading pixels are arranged in the passage region of the sheet transported on the feed path so as to be alighted in a vertical direction with respect to the direction of transport of the sheet, in which the reading pixels are repeatedly read and thus the amount of displacement of the position of the sheet transported is detected, in which a predetermined first threshold value and a second threshold value that is less than the first threshold value and that is input are set and in which when the amount of displacement of the position of the detected sheet is greater than the first threshold value, it is determined that an error occurs in the transported sheet such that an image formation operation is stopped whereas when the amount of displacement of the position of the detected sheet is equal to or less than the first threshold value but is greater than the second threshold value, it is determined that an error occurs in the transported sheet such that the image formation operation is continued without being stopped.

The image forming apparatus stores sheets. A bundle of sheets stored are supplied one by one. In the image forming apparatus, the supplied sheets are transported one by one so as to be printed. Here, a sheet which is different from a sheet desired to be used by a printer may be erroneously included in the bundle of sheets. In other words, within one paper feed cassette, a sheet whose size is different may be set. In this case, the size of the sheets which are fed is changed partway through the bundle of sheets.

A sheet with punch holes may be printed. For example, a plurality of punch holes for binding a sheet are aligned in a column. A sheet with punch holes may be set upside down partway through the bundle of sheets. In this case, the positions of the punch holes are changed partway through a bundle of sheets.

A printed product obtained by using a sheet which is not desired by a printer is wasted. There is a problem in which sheets that are not intended (that are not desired to be used) may be used from partway through a print job. By wasted printing, sheets, color materials, time and electric power are consumed so as to be useless. In recent years, the number of image forming apparatuses whose print speed is high has been increasing. It is likely that when the problem is noticed, a large amount of wasted printing has already been performed.

The commonly known image forming apparatus described above can cope with the displacement of the position of sheets. However, the commonly known image forming apparatus cannot detect a case where a sheet with punch holes is changed in orientation and a case where the sheet size is changed partway through. Hence, the commonly known image forming apparatus cannot cope with the problem described above.

SUMMARY

An Image forming apparatus according to the present disclosure includes a paper feeder, a sheet transporter, an image former, a sheet reader, a storage medium and a controller. The paper feeder feeds a sheet. The sheet transporter transports the sheet supplied from the paper feeder. The image former prints the transported sheet. The sheet reader is provided on an upstream side in a sheet transport direction with respect to the image former so as to read the transported sheet. The storage medium stores data. The sheet reader reads the entire sheet transported. The controller generates, based on read image data which is image data of the sheet obtained by the reading of the sheet reader, region classification image data for distinguishing between a region of the sheet and a region other than the sheet in the read image data. The controller stores, in the storage medium, the generated region classification image data. The controller performs comparison processing in which reference image data that is the region classification image data of the first sheet in a print job and comparison target image data that is the region classification image data for comparison with the reference image data are compared. The controller sets the region classification image data of each of the second and subsequent sheets in the print job to the comparison target image data. The controller determines, based on the comparison processing, whether or not the sheet corresponding to the comparison target image data is abnormal for the first sheet in the print job. The controller makes the sheet transporter stop the transport of the sheet such that the image former is made to stop image formation when determining that the sheet corresponding to the comparison target image data is abnormal.

A method of controlling an image forming apparatus according to the present disclosure includes: feeding a sheet, transporting the fed sheet; using an image former so as to print the transported sheet; providing a sheet reader which reads the transported sheet on an upstream side in a sheet transport direction with respect to the image former; using the sheet reader so as to read the entire sheet transported; generating, based on read image data which is image data of the sheet obtained by the reading of the sheet reader, region classification image data for distinguishing between a region of the sheet and a region other than the sheet in the read image data; storing the generated region classification image data; performing comparison processing in which reference image data that is the region classification image data of the first sheet in a print job and comparison target image data that is the region classification image data for comparison with the reference image data are compared; setting the region classification image data of each of the second and subsequent sheets in the print job to the comparison target image data; determining, based on the comparison processing, whether or not the sheet corresponding to the comparison target image data is abnormal for the first sheet in the print job; and stopping the transport of the sheet and image formation when it is determined that the sheet corresponding to the comparison target image data is abnormal.

Further features and advantages of the present invention will become apparent from the description of an embodiment given below.

DETAILED DESCRIPTION

In the present disclosure, the start of transport of a different sheet partway through a print job is detected, and thus wasted printing is prevented from being performed on the sheet different from a sheet which is desired to be used. An embodiment of the present disclosure will be described below with reference to FIGS. 1 to 10. The description will be given using a printer 100 as an example of an image forming apparatus. The printer 100 is a printer of an inkjet type. The printer 100 may be a multifunctional machine which includes a scanner. The image forming apparatus may be an image forming apparatus which uses toner so as to perform printing.

(Outline of Printer 100)

Figure 1:
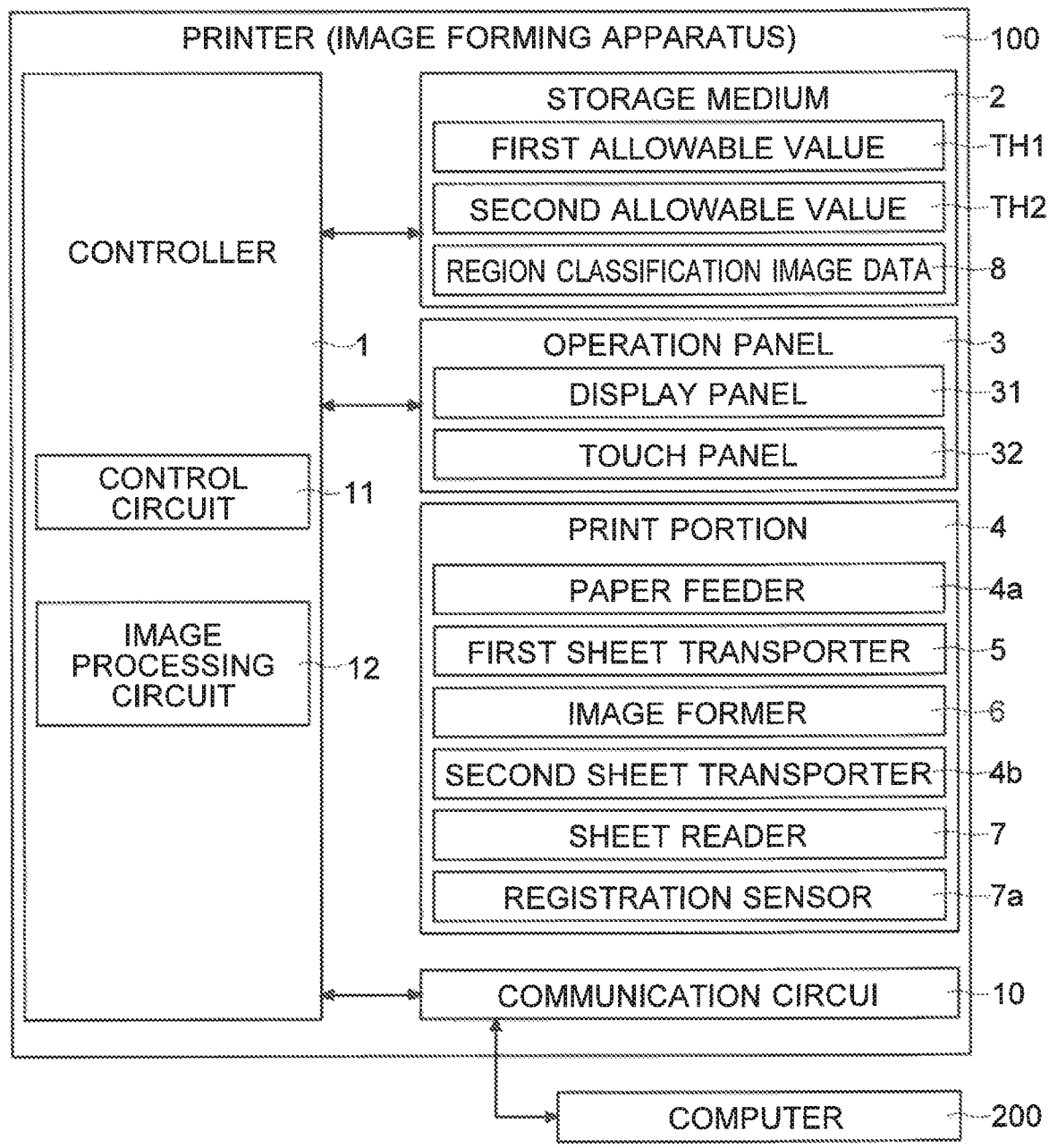
FIG. 1 is a diagram showing an example of a printer according to an embodiment.
Figure 2:
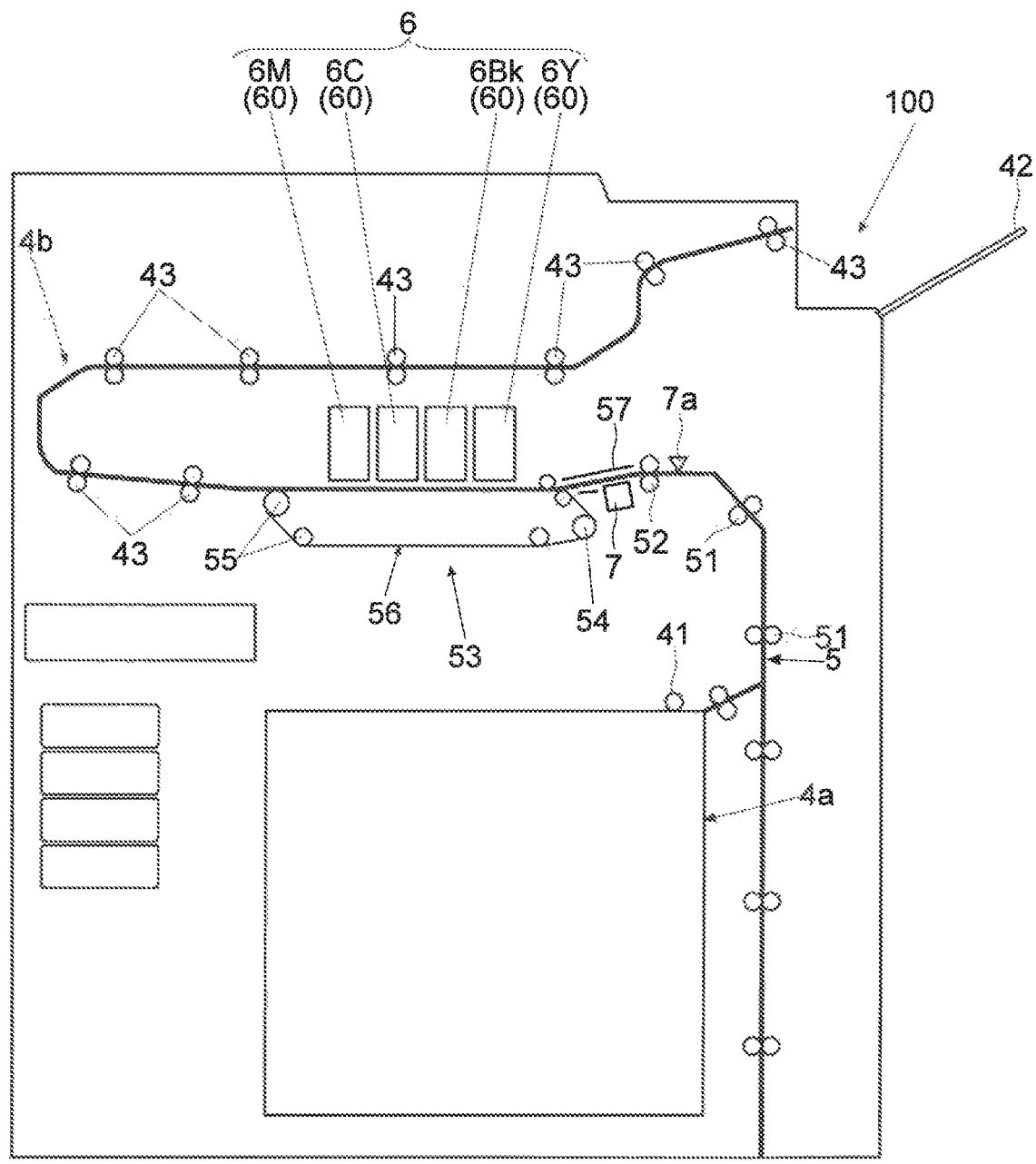
FIG. 2 is a diagram showing the example of the printer according to the embodiment.

The printer 100 according to the embodiment will first be described with reference to FIGS. 1 and 2. The printer 100 includes a controller 1, a storage medium 2, an operation panel 3, a print portion 4 and a communication circuit 10. The controller 1 controls the individual portions of the printer 100. The controller 1 includes a control circuit 11 and an image processing circuit 12. For example, the control circuit 11 is a CPU. Based on a control program and control data stored in the storage medium 2, the control circuit 11 performs computation and processing. The storage medium 2 includes a nonvolatile storage device such as a ROM or a storage (a HDD or a flash ROM) and a volatile storage device such as a RAM.

The operation panel 3 includes a display panel 31 and a touch panel 32. The display panel 31 displays a setting screen and information. The controller 1 displays, on the display panel 31, operation images such as a key, a button and a tub. The touch panel 32 detects a touch operation on the display panel 31. Based on the output of the touch panel 32, the controller 1 recognizes the operation image which is operated. The controller 1 recognizes a setting operation which is performed by a user.

The printer 100 includes the print portion 4. The controller 1 controls the operation of the print portion 4. As shown in FIGS. 1 and 2, the print portion 4 includes a paper feeder 4a, a first sheet transporter 5, an image former 6, a second sheet transporter 4b, a sheet reader 7 and a registration sensor 7a.

The paper feeder 4a stores a bundle of sheets. The paper feeder 4a includes a paper feed roller 41. The paper feed roller 41 makes contact with the uppermost sheet of the bundle of sheets set within the paper feeder 4a. A paper feed motor (unillustrated) for rotating the paper feed roller 41 is provided. At the time of a print job, the controller 1 rotates the paper feed motor so as to rotate the paper feed roller 41. In this way, the sheet is fed out from the paper feeder 4a to the first sheet transporter 5.

The first sheet transporter 5 transports the sheet. At the time of the print job, the controller 1 makes the first sheet transporter 5 transport, toward the image former 6, the sheet supplied from the paper feeder 4a. In FIG. 2, a sheet transport path is indicated by a thick line. A plurality of first transport rollers 51 are provided along the sheet transport path. In order to rotate these rotation members, a first transport motor (unillustrated) is provided. At the time of the print job, the controller 1 rotates the first transport motor so as to rotate the first transport rollers 51.

In the first sheet transporter 5, a registration roller pair 52 (registration rollers) is provided. On a sheet transport route from the paper feeder 4a to the image former 6, the registration roller pair 52 is provided. In order to rotate the registration roller pair 52, a registration motor (unillustrated) Is provided. The controller 1 controls the rotation of the registration motor so as to control the rotation of the registration roller pair 52.

In the first sheet transporter 5, the registration sensor 7a is provided. The registration sensor 7a is provided on the upstream side of the registration roller pair 52 in a sheet transport direction. The output level of the registration sensor 7a is changed depending on whether or not the presence of the sheet is detected. When the tip end of the sheet reaches the registration sensor 7a, the output level of the registration sensor 7a is changed. When the back end of the sheet passes the registration sensor 7a, the output level of the registration sensor 7a is changed. The output of the registration sensor 7a is input to the controller 1. Based on the output of the registration sensor 7a, the controller 1 recognizes that the tip end of the sheet reaches the registration sensor 7a. The controller 1 recognizes that the back end of the sheet is passed through the registration sensor 7a. In other words, based on the output of the registration sensor 7a, the controller 1 can recognize that the tip end of the sheet reaches the registration roller pair 52 and that the back end of the sheet passes the registration roller pair 52.

When the controller 1 recognizes that the tip end of the sheet reaches the registration roller pair 52, the controller 1 stops the registration roller pair 52. For example, when the controller 1 recognizes that the back end of the sheet is passed through the registration sensor 7a, the controller 1 stops the registration roller pair 52. On the other hand, the controller 1 rotates the first transport roller 51 which is directly on the upstream side with respect to the registration roller pair 52. The tip end of the sheet makes contact with the registration roller pair 52. Furthermore, the sheet which makes contact therewith is bent. By the elasticity of the sheet, the tip end of the sheet is along the nip of the registration roller pair 52. The skew of the sheet is corrected.

When a predetermined waiting time elapses after it is recognized based on the output of the registration sensor 7a that the tip end of the sheet reaches the registration sensor 7a, the controller 1 rotates the registration roller pair 52. In this way, the sheet is fed out to a transport belt.

The first sheet transporter 5 includes a transport unit 53. The transport unit 53 includes a drive roller 54, a plurality of driven rollers 55 and the transport belt 56. The transport belt 56 is placed around the drive roller 54 and the driven rollers 55. At the time of the print job, the controller 1 rotates a belt motor. The belt motor rotates the drive roller 54. Consequently, the sheet supplied from the paper feeder 4a is transported on the transport belt 56. The transport unit 53 includes a suction portion (unillustrated). The suction portion uses the suction of air or an electrostatic force so as to suck the sheet to the transport belt 56. By the suction, the position of the sheet and distances between nozzles and the sheet are fixed. At the time of the printing, the controller 1 operates the suction portion. Between the paper feeder 4a and the transport unit 53, a transport guide 57 is provided so as to face both the surfaces of the sheet. The transport guide 57 forms the transport path. The sheet is transported along the transport guide 57.

The image former 6 discharges inks on the transported sheet so as to record an image. The image former 6 includes a plurality of line heads 60. Specifically, the printer 100 includes four line heads 60 (6Bk, 6C, 6M and 6Y). The line head 6Bk discharges the ink of black. The line head 6C discharges the ink of cyan. The line head 6M discharges the ink of magenta. The line head 6Y discharges the ink of yellow.

The line heads 60 are provided above the transport belt 56. The line heads 60 are fixed. The line heads 60 include a plurality of nozzles. The nozzles are aligned in a main scanning direction (direction perpendicular to the transport direction). The individual nozzles discharge the inks to the sheet which is transported. The openings of the nozzles are opposite the transport belt 56. At the time of the printing, the transport unit 53 transports the sheet toward the line heads 60, and transports the sheet opposite the nozzles.

Between the individual line heads 60 and the transport belt 56, a gap (distance) is provided. The width of the distance is previously determined. For example, the distance is about 1 mm to several millimeters. The inks discharged from the nozzles reach the transported sheet. In this way, the image is recorded (formed). For each of the line heads 60, an ink tank for supplying the ink is provided.

The controller 1 makes the second sheet transporter 4b transport the sheet which passes the line heads 60. The second sheet transporter 4b transports the sheet toward an ejection tray 42. The second sheet transporter 4b includes a plurality of second transport rollers 43. In order to rotate the second transport rollers 43, a second transport motor (unillustrated) is provided.

The sheet reader 7 is provided between the image former 6 and the registration roller pair 52. The sheet reader 7 may be provided on the upstream side with respect to the registration roller pair 5 in the sheet transport direction. The sheet reader 7 reads the entire sheet which is transported. Specifically, the sheet reader 7 includes a light source 71 and an image sensor 72 (line sensor) (see FIG. 4). The light source 71 and the image sensor 72 may be separate members. In this case, the light source 71 is provided in a position opposite the image sensor 72. As described above, the sheet may be passed between the light source 71 and the image sensor 72.

The light source 71 illuminates the sheet transport path (the transport guide 57) and the sheet. The image sensor 72 includes a plurality of light receiving elements (reading elements). The light receiving elements are aligned in a line. The direction (main scanning direction) of the line of the light receiving elements is perpendicular to the sheet transport direction. While the sheet is being transported, the Image sensor 72 repeats the reading in the direction perpendicular to the sheet transport direction. An analogue image signal which is output by each of the light receiving elements is input to the controller 1 (the image processing circuit 12). The controller 1 converts the input analogue image signal into a digital signal so as to generate image data.

The controller 1 is connected to the communication circuit 10. The communication circuit 10 includes hardware (a connector and a communication circuit) and software for communication. The communication circuit 10 communicates with a computer 200. For example, the computer 200 is a PC or a server. The controller 1 receives print data from the computer 200. For example, the print data includes data described in a page description language and print setting information. The print setting information is setting information for the print job. The print setting information includes the details of print settings which are performed with the computer 200 by the user. For example, when settings are performed with the computer 200 such that double-sided printing is performed, the computer 200 includes, in the print setting information, information indicating that double-sided printing is performed.

The controller 1 (the image processing circuit 12) analyzes the received (Input) print data (data described in the page description language). Based on the data described in the page description language, the controller 1 generates print image data (raster data). Based on the print image data, the controller 1 performs image processing. The controller 1 finally performs the image processing such as halftone processing so as to generate ink discharge image data. The ink discharge image data is data indicating the positions of the nozzles from which the inks need to be discharged and timing with which the inks are discharged. Based on the ink discharge image data, the controller 1 makes the line heads 60 discharge the inks per line.

(Reading of Transported Sheet at the Time of Print Job)

An example of the flow of reading of the transported sheet when the print job is performed with the printer 100 according to the embodiment will then be described with reference to FIGS. 3 to 5. In the print job, a plurality of sheets may be continuously printed. For example, when ten copies of a 10-page document are printed, in the print job thereof, 100 sheets are continuously printed. The controller 1 determines whether or not an abnormality occurs in the second and subsequent sheets. A criterion for whether or not an abnormality occurs is based on the first sheet. In order to determine whether or not an abnormality occurs in the second and subsequent sheets, the controller 1 makes the sheet reader 7 read the individual sheets which are transported. The controller 1 acquires the image data of each of the sheets.

Figure 3:
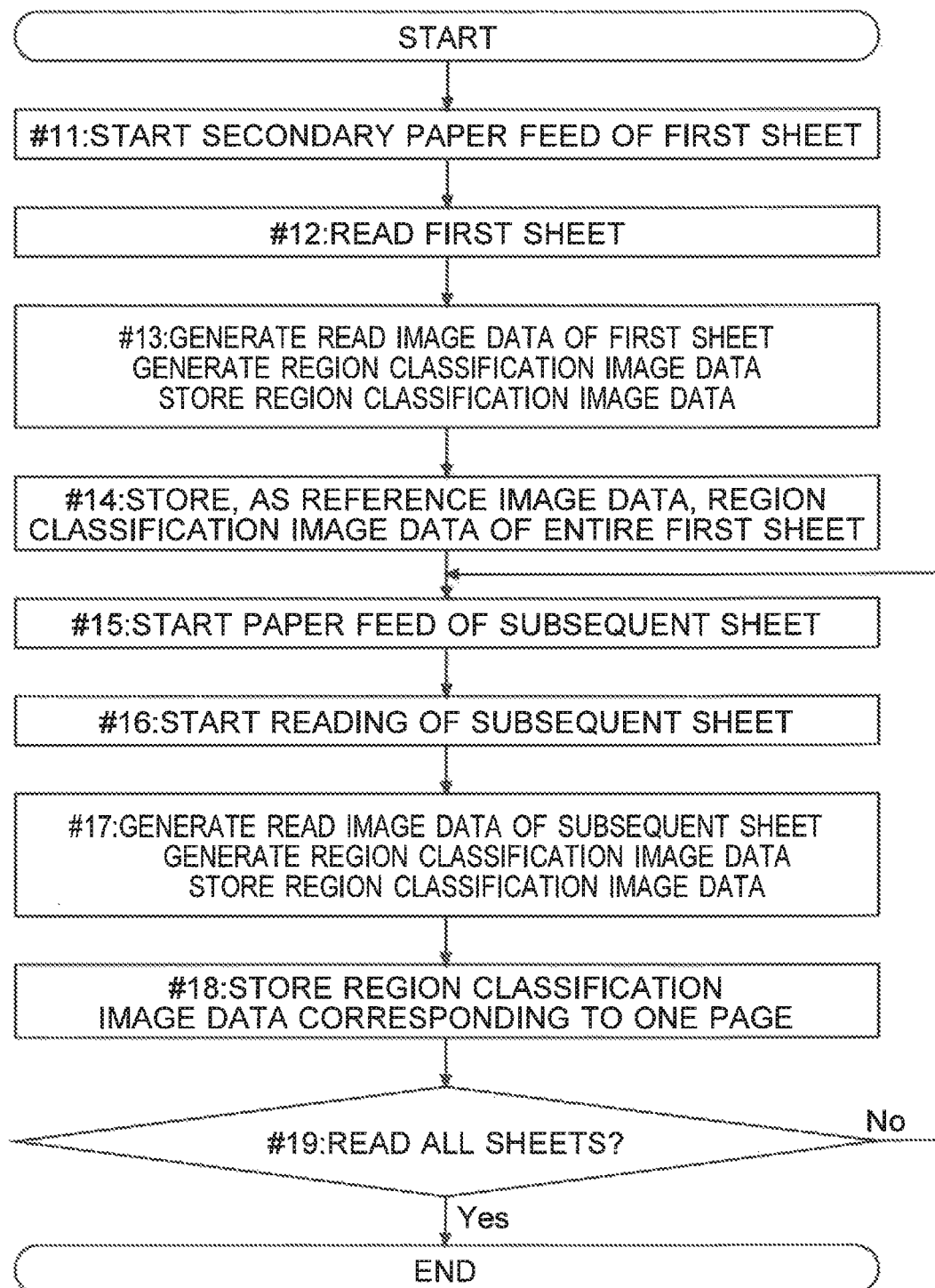
FIG. 3 is a diagram showing an example of the flow of reading processing on a transported sheet when a print job is performed in the printer according to the embodiment.
Figure 4:
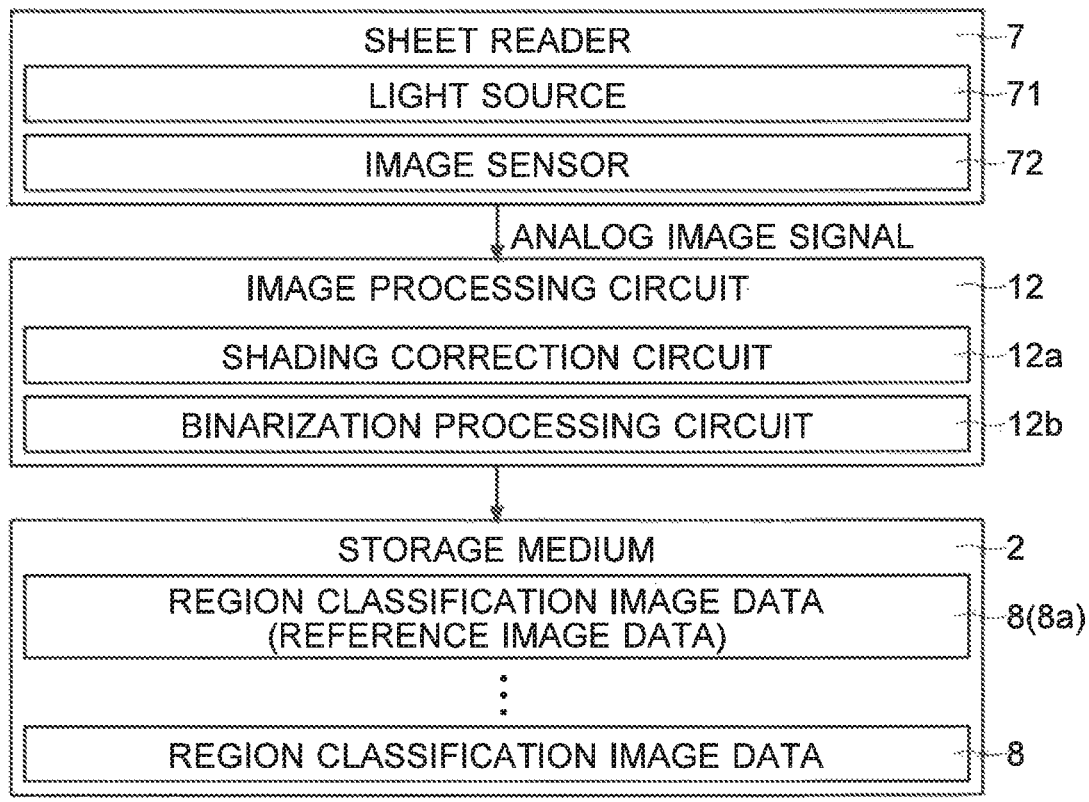
FIG. 4 is a diagram showing an example of an image processing circuit in the embodiment.

The start of FIG. 3 is a time when after the start of a print job which continuously prints a plurality of sheets, the first sheet is fed and the registration sensor 7a recognizes that the tip end of the first sheet reaches the registration sensor 7a. The controller 1 makes the first sheet transporter 5 start the secondary paper feed of the first sheet (step #11). The secondary paper feed refers to paper feed from the registration roller pair 52. In the secondary paper feed, the controller 1 starts the rotation of the registration roller pair 52. The controller 1 makes the sheet reader 7 start the reading of the first sheet (step #12). The controller 1 finally makes the sheet reader 7 read the entire first sheet which is transported.

The controller 1 simultaneously performs the generation of the read image data of the first sheet, the generation of the region classification image data 8 of the first sheet and the storage of the region classification image data 8 (step #13). The region classification image data 8 is data for distinguishing between the region of the sheet and a region other than the sheet.

The Image sensor 72 (line sensor) of the sheet reader 7 outputs analogue image signals per line in the main scanning direction. When the analogue image signals corresponding to one line are input, the controller 1 (the image processing circuit 12) generates the read image data corresponding to one line in the main scanning direction. When the read image data corresponding to one line in the main scanning direction is generated, the controller 1 generates the region classification image data 8 corresponding to one line. The controller 1 stores, in the storage medium 2, the generated region classification image data 8 corresponding to one line. By repeating this operation, the region classification image data 8 including the entire sheet is finally generated.

For example, the image processing circuit 12 is an ASIC for image processing. As shown in FIG. 4, the image processing circuit 12 includes a shading correction circuit 12a and a binarization processing circuit 12b. For example, the shading correction circuit 12a and the binarization processing circuit 12b are circuits within the image processing circuit 12. With a computation circuit and programs within the image processing circuit 12, the shading correction circuit 12a and the binarization processing circuit 12b may be realized by software.

The shading correction circuit 12a performs shading correction on the read image data. The binarization processing circuit 12b performs binarization processing on the read image data after the shading correction. The binarization processing circuit 12b performs the binarization processing with a predetermined binarization threshold value. For example, the binarization threshold value is a center value in a range between the maximum value and the minimum value of pixel values. The binarization processing circuit 12b replaces, with zero, the pixel value of a pixel (dark pixel) which is equal to or less than the binarization threshold value. The binarization processing circuit 12b replaces, with one, the pixel value of a pixel (bright pixel) which exceeds the binarization threshold value. For example, each time the read image data corresponding to one line in the main scanning direction is generated, the controller 1 performs the shading correction and the binarization processing on the read image data corresponding to one line. The controller 1 repeats the shading correction and the binarization processing. The controller 1 generates image data obtained by binarizing the read image data as the region classification image data 8. The binarization processing circuit 12b of the controller 1 generates the image data obtained by binarizing the read image data as the region classification image data 8.

The reading of the entire first sheet is completed. Here, the controller 1 stores, in the storage medium 2, the region classification image data 8 of the entire first sheet as reference image data 8a (step #14). For example, the controller 1 stores the reference image data 8a in the RAM of the storage medium 2.

Figure 5:
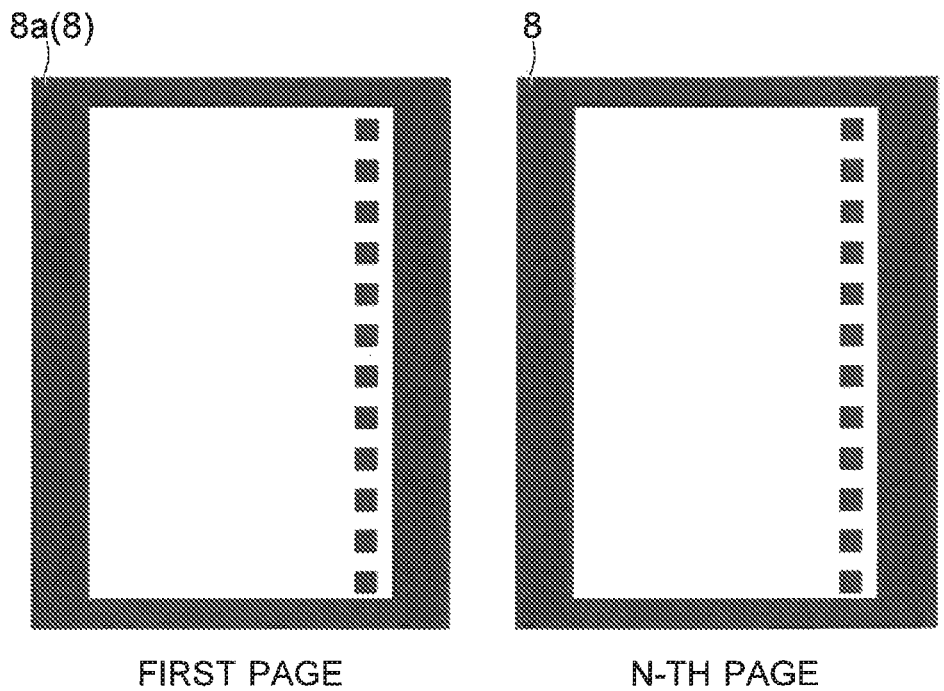
FIG. 5 is a diagram showing an example of region classification image data in the embodiment.

FIG. 5 shows an example of the region classification image data 8 of the first sheet and any page (Nth page) of the second and subsequent sheets in the print job. FIG. 5 shows an example of the region classification image data 8 of a sheet with punch holes. For example, the transport guide 57 is shown in black or dark gray. The pixel value of a pixel which reads a white sheet exceeds the binarization threshold value. The pixel value of a pixel which reads part (the transport guide 57) other than the sheet is equal to or less than the binarization threshold value. By the binarization processing, the region classification image data 8 serves as data of the read image data for distinguishing between a pixel which reads the sheet and a pixel which does not read the sheet. Based on the region classification image data 8 corresponding to one page, the controller 1 can check the size, the position and the inclination of the sheet and whether or not the sheet is folded.

The controller 1 makes the first sheet transporter 5 start the secondary paper feed of the subsequent sheet (step #15). The controller 1 makes the sheet reader 7 start the reading of the subsequent sheet (step #16). The controller 1 simultaneously performs the generation of the read image data of the subsequent sheet, the generation of the region classification image data 8 of the subsequent sheet and the storage of the region classification image data 8 of the subsequent sheet (step #17). As in the first sheet, the controller 1 generates the region classification image data 8 of the second and subsequent sheets. The flow and the procedure of the generation are preferably the same as those for the first sheet. However, after the start of the reading of the subsequent sheet, the controller 1 reads the same line number as the reference image data 8a in the sheet transport direction (subscanning direction). In this way, it is possible to set the sizes of the read image data and the region classification image data 8 of the individual sheets in the transport direction to the same size.

The image sensor 72 of the sheet reader 7 outputs the analogue image signals corresponding to one line at predetermined intervals. The sheet reader 7 repeats the reading in the subscanning direction. Each time the read image data corresponding to one line in the main scanning direction is generated, the controller 1 generates and stores the region classification image data 8 corresponding to one line. The controller 1 (the image processing circuit 12) finally generates the read image data and the region classification image data 8 of the second and subsequent sheets. The controller 1 (the image processing circuit 12) finally stores, in the storage medium 2, the generated region classification image data 8 corresponding to one page (the region classification image data 8 of the second and subsequent sheets) (step #18). The controller 1 makes the sheet reader 7 read the entire sheet which is transported.

The controller 1 checks whether or not all sheets which are transported in the print job are read (step #19). In other words, the controller 1 checks whether or not the number of times (the number of pages) the region classification image data 8 is generated after the start of the print job is equal to the number of sheets printed in the print job. When all the sheets are read (yes in step #19), the controller 1 completes the present flow (end). When the reading of all the sheets is not completed (no in step #19), the controller 1 performs step #15 (returns to step #15).

As described above, when a plurality of sheets are printed, the controller 1 makes the sheet reader 7 read the transported sheets one by one. Then, the controller 1 generates the region classification image data 8 of each of the sheets. Here, timing with which the reading of each of the sheets with the sheet reader 7 is started and timing with which reading of each of the sheets with the sheet reader 7 is completed will be described. Before the tip end of the sheet passes the reading line of the sheet reader 7, the controller 1 may make the sheet reader 7 start the reading. The controller 1 may make the sheet reader 7 start the reading simultaneously with the start (the start of the secondary paper feed) of the rotation of the registration roller pair 52.

A time obtained by dividing a distance from the nip of the registration roller pair 52 to the position of the reading line of the sheet reader 7 by a sheet transport speed on specifications (design) is assumed to be a first time. The controller 1 may make the sheet reader 7 start the reading after the start of the secondary paper feed before the first time elapses.

The controller 1 makes the sheet reader 7 complete the reading after the back end of the sheet passes the reading line of the sheet reader 7. A time obtained by dividing a distance from the registration sensor 7a to the reading line of the sheet reader 7 by the sheet transport speed on specifications (design) is assumed to be a second time. After the recognition of the passage of the back end of the sheet with the registration sensor 7a, the controller 1 makes the sheet reader 7 complete the reading after the second time elapses. Before the registration roller pair 52 starts the secondary paper feed of the subsequent sheet, the controller 1 temporarily completes the reading.

Based on the region classification image data 8, the controller 1 determines whether or not an abnormality occurs in the transported sheet. When the controller 1 determines that an abnormality occurs, the controller 1 completes the processing in the flowchart of FIG. 3. In other words, when the controller 1 determines that an abnormality occurs, the controller 1 forcibly completes the flowchart of FIG. 3.

(Determination of Abnormality in Sheet)

An example of the determination of an abnormality in the sheet in the printer 100 according to the embodiment will then be described with reference to FIGS. 6 to 8. The controller 1 compares the reference image data 8a and the region classification image data 8 of each of the second and subsequent sheets so as to determine whether or not an abnormality occurs in the sheet. The controller 1 repeatedly compares the image data of a line included in the reference image data 8a and the image data of a line included in the region classification image data 8 of each of the second and subsequent sheets. By repeating the comparison, the controller 1 determines whether or not an abnormality occurs in the sheet.

In the following description, the region classification image data 8 of a page (sheet) which is compared with the reference image data 8a is referred to as comparison target image data 8b. The image data of the line included in the reference image data 8a is referred to as reference line data. The image data of a line included in the comparison target image data 8b (the region classification image data 8 of a comparison target) is referred to as distinguishment line data. The reference line data and the distinguishment line data are data of one line parallel to a predetermined reference direction. In the following discussion of the embodiment, an example where the reference direction is the main scanning direction will be described.

Figure 6:
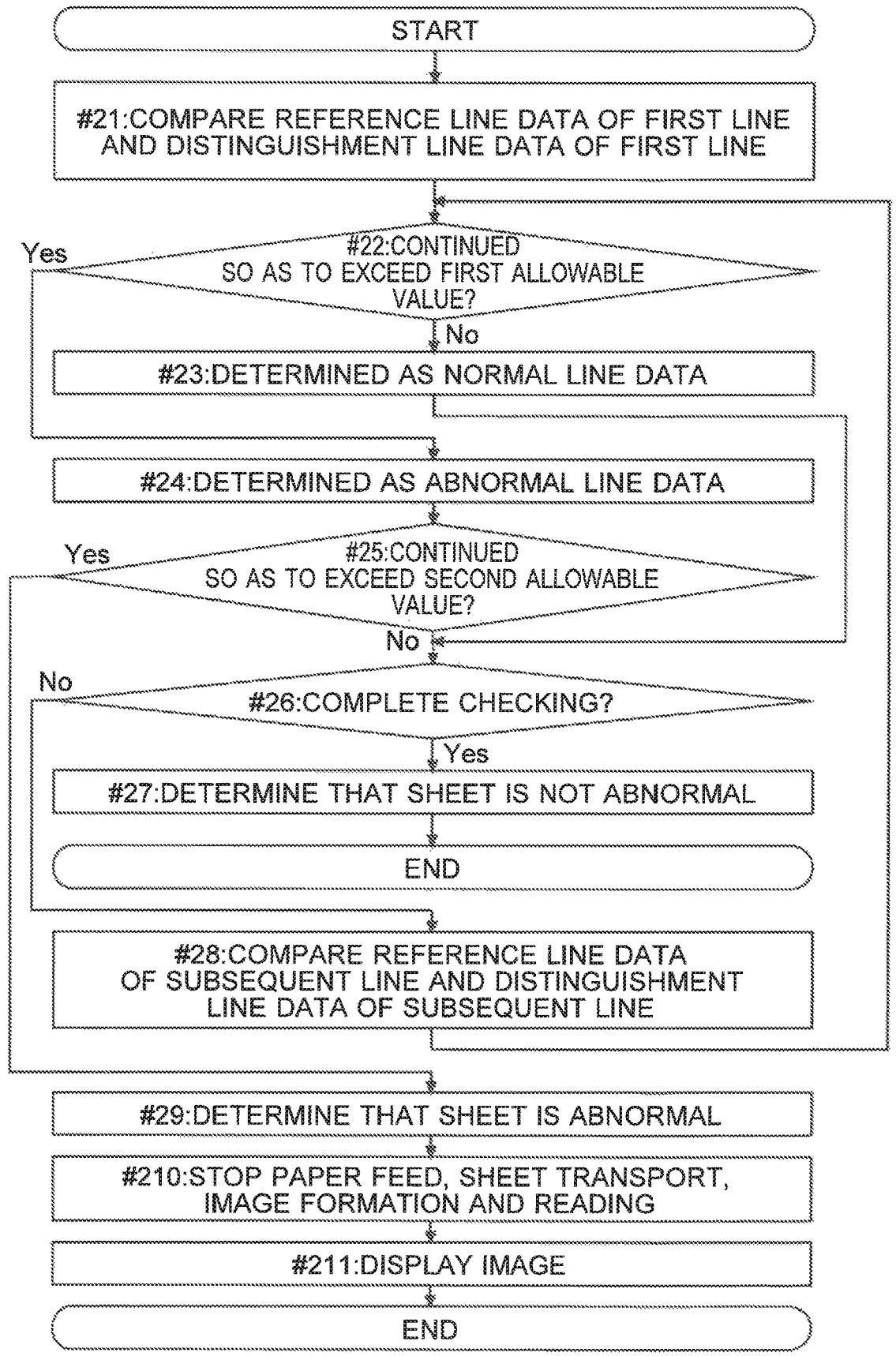
FIG. 6 is a diagram showing an example of the determination of an abnormality in a sheet in the printer according to the embodiment.

The start of FIG. 6 is a time when the region classification image data 8 of the first line (front line) is generated for the second and subsequent sheets. For the second and subsequent sheets, the controller 1 performs the flowchart of FIG. 6 sheet by sheet (for each piece of comparison target image data 8b).

The controller 1 repeats the generation of the reed image data and the region classification image data 8 per line in the main scanning direction. On the other hand, the comparison of the reference image data 8a and the region classification image data 8 is performed line by line. The direction of the reference line data and the distinguishment line data is the main scanning direction. Before all the sheets are read, the comparison of the image data of the line can be started. Hence, for the second and subsequent sheets, the controller 1 starts the comparison when the region classification image data 8 of the first line is generated.

The controller 1 compares the reference line data of the first line (front line) and the distinguishment line data of the first line (front line) of the comparison target image data 8b (the region classification image data 8 of a sheet on which whether or not an abnormality occurs is determined from now on) (step #21). The controller 1 compares the pixel values of pixels in the same positions in the reference line data and the distinguishment line data. A computation which is performed in the comparison is an equivalent logical operation. The controller 1 performs the equivalent logical operation. As long as the type of sheet is the same and the position and the orientation are not displaced, the pixel values of pixels in the same positions are the same value.

Figure 7:
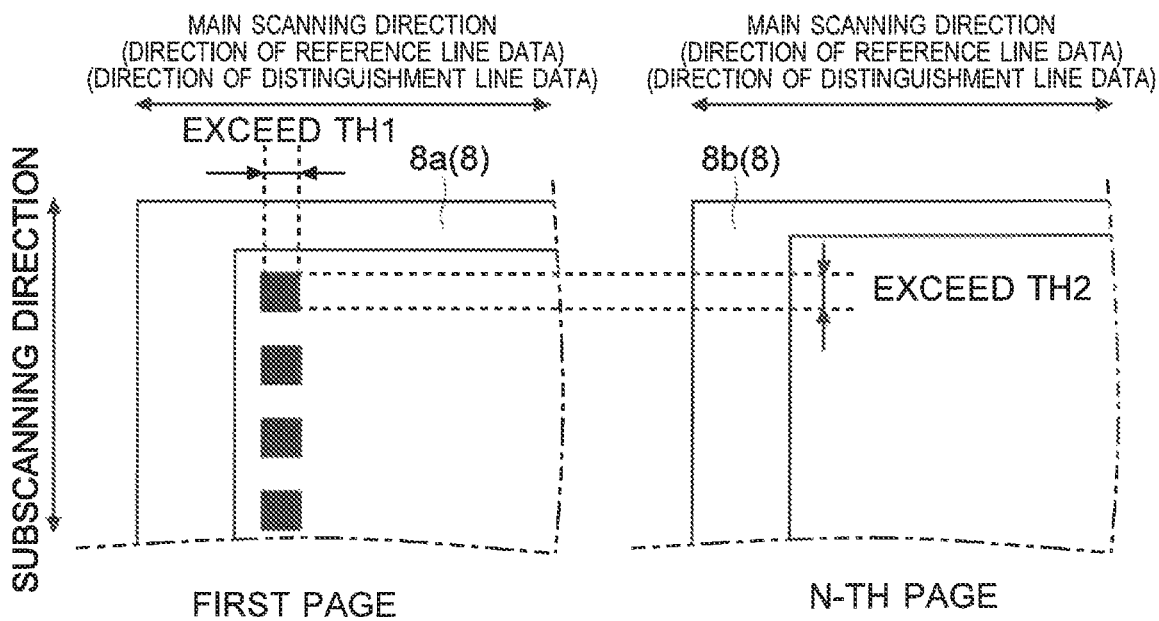
FIG. 7 is a diagram showing an example of reference image data and comparison target image data in the embodiment.
Figure 8:
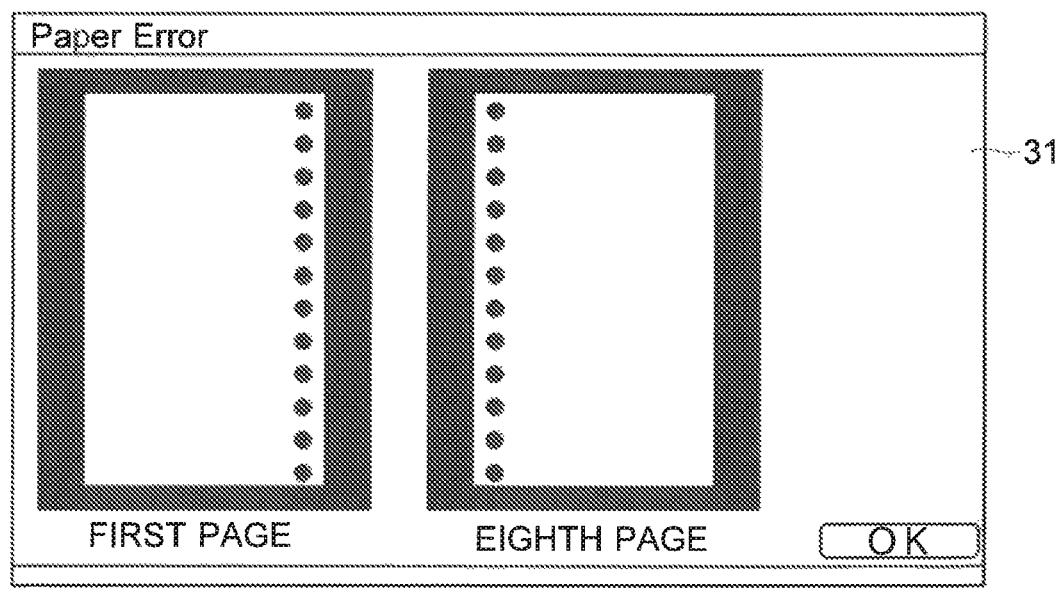
FIG. 8 is a diagram showing an example of a display screen in a display panel in the embodiment.

The controller 1 checks whether or not pixels whose pixel values are different are continued so as to exceed a first allowable value TH1 (step #22, see FIG. 7). The direction in which the pixels are continued is the main scanning direction. The position of the sheet may be slightly displaced (about 1 mm). A small displacement of the position of the sheet should not be determined to be an abnormality in the sheet. In order to allow a slight displacement, the controller 1 uses the first allowable value TH1 so as to perform the checking.

The first allowable value TH1 is previously determined. The storage medium 2 stores the first allowable value TH1 in a nonvolatile manner (see FIG. 1). For example, the first allowable value TH1 can be set to a value corresponding to about 1 mm to several millimeters. For example, when the first allowable value TH1 is set to 3 mm, the first allowable value TH1 can be set to a value obtained by dividing 3 mm by a pitch of one pixel in the reference image data 8a and the region classification image data 8 (the comparison target image data 8b). For example, in the printer 100, a sheet with punch holes can be used. The first allowable value TH1 may be set to a value corresponding to the minimum diameter among the punch holes provided in the sheet. The operation panel 3 may receive the setting of the first allowable value TH1. In this case, the controller 1 stores, in the storage medium 2, the first allowable value TH1 set in the operation panel 3. The controller 1 uses the first allowable value TH1 which is set so as to perform processing.

When pixels whose pixel values are different are not continued so as to exceed the first allowable value TH1 (no in step #22), the controller 1 determines that the distinguishment line data which is currently being compared is normal line data (step #23). On the other hand, when pixels whose pixel values are different are continued so as to exceed the first allowable value TH1 (yes in step #22), the controller 1 determines that the distinguishment line data which is currently being compared is abnormal line data (step #24). FIG. 7 shows an example where in the main scanning direction, pixels whose pixel values are different are continued so as to exceed the first allowable value TH1.

When the controller 1 determines that the distinguishment line data is the abnormal line data, the controller 1 checks whether or not a continued number in the abnormal line data of the comparison target image data 8b exceeds a second allowable value TH2 (step #25, see FIG. 7). The continued direction is a direction (subscanning direction) perpendicular to the main scanning direction. After step #23 or when the second allowable value TH2 is not exceeded (no in step

25), the controller 1 checks whether or not the comparison of all lines in the comparison target image data 8*b* is completed (step #26). The controller 1 checks whether or not the checking on the current page (sheet) is completed.

When the comparison of all the lines is completed (yes in step #26), the controller 1 determines that an abnormality does not occur in the sheet corresponding to the comparison target image data 8*b* (step #27). Then, the controller 1 completes the present flow (end).

When the comparison of all the lines is not completed (no in step #26), the controller 1 compares the reference line data of the subsequent line and the distinguishment line data of the subsequent line in the comparison target image data 8*b* (step #28). The controller 1 continues to check the line data which is not compared. The controller 1 compares the pixel values of pixels in the same positions in the reference line data and the distinguishment line data of each line. The comparison here is also an equivalent logical operation. Then, the flow returns to step #22. As described above, the controller 1 checks the pixel value of the m-th pixel in the line data of the n-th line in the main scanning direction and the pixel value of the m-th pixel in the line data of the n-th line in the comparison target image data 8*b* of any page (page which is compared) subsequent to the second sheet.

The second allowable value TH2 is also previously determined. The storage medium 2 stores the second allowable value TH2 in a nonvolatile manner (see FIG. 1). For example, the second allowable value TH2 can be set to a value corresponding to about 1 mm to several millimeters. For example, when the second allowable value TH2 is set to 3 mm, the second allowable value TH2 can be set to a value obtained by dividing 3 mm by a pitch of one pixel in the reference image data 8*a* and the region classification image data 8 (the comparison target image data 8*b*). For example, in the printer 100, the sheet with punch holes can be used. The second allowable value TH2 may be set to a value corresponding to the minimum diameter among the punch holes provided in the sheet. The operation panel 3 may receive the setting of the second allowable value TH2. In this case, the controller 1 stores, in the storage medium 2, the second allowable value TH2 set in the operation panel 3. The controller 1 uses the second allowable value TH2 which is set so as to perform processing.

When the continued number in the abnormal line data exceeds the second allowable value TH2 (yes in step #25), the controller 1 determines that an abnormality occurs in the sheet corresponding to the comparison target image data 8*b* (step #29). FIG. 7 shows an example where in the subscanning direction, the abnormal line data is continued so as to exceed the second allowable value TH2. The second allowable value TH2 is used, and thus even when the sheet is displaced in position, is skewed or is folded so as not to cause a problem in the printing, it is possible to prevent a determination from being made that an abnormality occurs in the sheet.

When the controller 1 determines that an abnormality occurs in the sheet, the controller 1 stops the paper feed, the transport of the sheet, the image formation and the reading (step #210). Specifically, the controller 1 stops the paper feed operation of the paper feeder 4*a*. The controller 1 makes the sheet transporter stop the transport of the sheet. The controller 1 makes the image former 6 stop the image formation (ink discharge). The controller 1 makes the sheet reader 7 stop the reading. In other words, the controller 1 stops the operation involved in the printing.

The controller 1 displays, on the display panel 31, an image based on the reference image data 8*a* and an image based on the comparison target image data 8*b* (the region classification image data 8) on which it is determined that an abnormality occurs (step #211). FIG. 8 shows an example of a screen that is displayed when it is determined that an abnormality occurs. FIG. 8 shows an example of a screen that is displayed when an abnormality is detected in which the direction of setting of a punched sheet is opposite. In FIG. 8, it is determined that an abnormality occurs in the sheet of the eighth page.

When it is determined that an abnormality occurs, the controller 1 reduces the reference image data 8*a* so as to correspond to the resolution of the display panel 31. The controller 1 reduces the reference image data 8*a* such that the entire reference image data 8*a* can be displayed. Since the reference image data 8*a* and the region classification image data 8 are equal in size, the controller 1 reduces, at the same magnification as in the reference image data 8*a*, the region classification image data 8 on which it is determined that an abnormality occurs. In other words, the controller 1 generates image data for display of a preview image (thumbnail image). Based on the generated image data, the controller 1 displays an image indicating the reference image data 8*a* and an image indicating the region classification image data 8 (the comparison target image data 8*b*) corresponding to the sheet on which it is determined that an abnormality occurs. Even when step #211 is reached, the present flow is completed (end).

(First Variation)

An example of the determination of an abnormality in a sheet in a printer 100 according to a first variation will then be described with reference to FIGS. 9 and 10. In the discussion of the embodiment described above, the example where the direction of the reference line data and the distinguishment line data is the main scanning direction is described. However, the direction of the reference line data and the distinguishment line data may be the subscanning direction. Processing when the direction of the line data described above is the subscanning direction (the sheet transport direction) will be described as the first variation. Even in the first variation, the reference line data and the distinguishment line data are data of one line parallel to the reference direction (in the same direction as the reference direction). In the first variation, the reference direction is the subscanning direction. In the other points, the printer 100 according to the first variation is the same as the printer 100 according to the embodiment.

Figure 9:
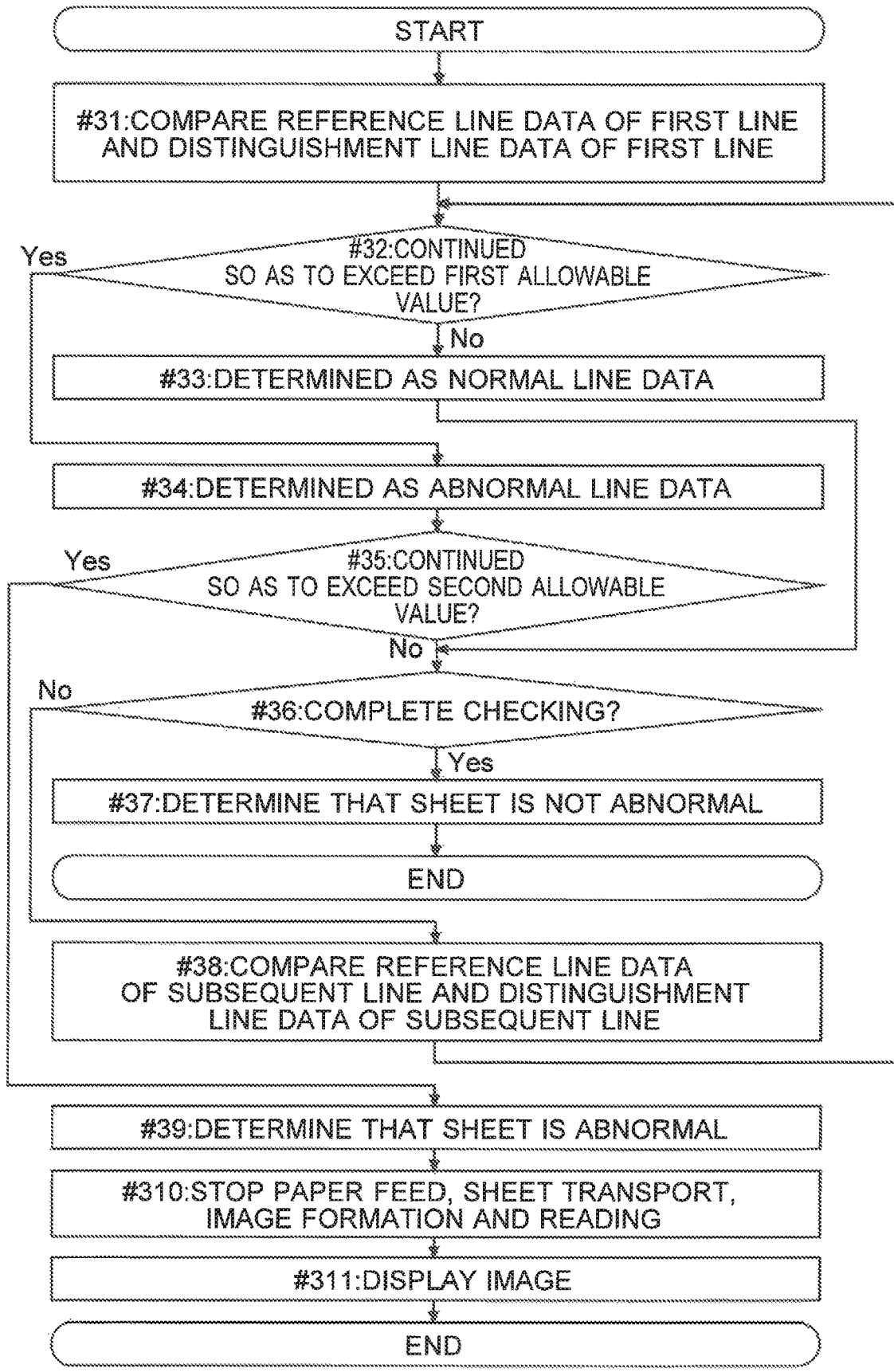
FIG. 9 is a diagram showing an example of the determination of an abnormality in a sheet in a printer according to a first variation.

The start of FIG. 9 is a time when the reading of the second and subsequent sheets is completed. This is because after the completion of reading of the entire sheet, the comparison of the image data of a line can be stated in the subscanning direction of one column. Even in the first variation, the controller 1 performs the flowchart of FIG. 9 in each of the second and subsequent sheets.

The controller 1 compares the reference line data of the first column (front line) and the distinguishment line data of the first column (front line) of the comparison target image data 8*b* (the region classification image data 8 of a sheet on which whether or not an abnormality occurs is determined from now on) (step #31). The controller 1 compares the pixel values of pixels in the same positions in the reference line data and the distinguishment line data. Even here, a computation which is performed in the comparison is also an equivalent logical operation. The controller 1 performs the equivalent logical operation. As long as the type of sheet is the same and the position and the orientation are not displaced, the pixel values of pixels in the same positions are the same value.

Figure 10:
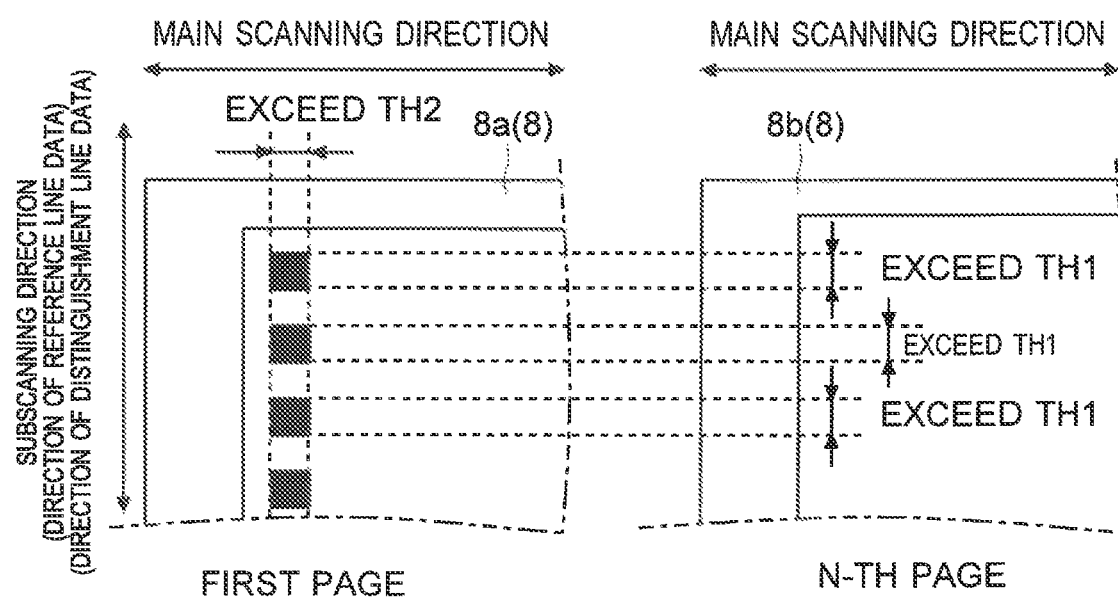
FIG. 10 is a diagram showing an example of reference image data and comparison target image data in the first variation.

The controller 1 checks whether or not pixels whose pixel values are different are continued so as to exceed the first allowable value TH1 (step #32, see FIG. 10). The direction in which the pixels are continued is the subscanning direction. The position of the sheet may be slightly displaced (about 1 mm). A small displacement of the position of the sheet should not be determined to be an abnormality in the sheet. In order to allow a slight displacement, the controller 1 uses the first allowable value TH1 so as to perform the checking.

When pixels whose pixel values are different are not continued so as to exceed the first allowable value TH1 (no in step #32), the controller 1 determines that the distinguishment line data which is currently being compared is normal line data (step #33). On the other hand, when pixels whose pixel values are different are continued so as to exceed the first allowable value TH1 (yes in step #32), the controller 1 determines that the distinguishment line data which is currently being compared is abnormal line data (step #34). FIG. 10 shows an example where in the subscanning direction, pixels whose pixel values are different are continued so as to exceed the first allowable value TH1.

When the controller 1 determines that the distinguishment line data is the abnormal line data, the controller 1 checks whether or not a continued number in the abnormal line data of the comparison target image data 8b exceeds the second allowable value TH2 (step #35, see FIG. 9). The continued direction is a direction (main scanning direction) perpendicular to the subscanning direction. After step #33 or when the second allowable value TH2 is not exceeded (no in step #35), the controller 1 checks whether or not the comparison of all lines in the comparison target image data 8b is completed (step #36). The controller 1 checks whether or not the checking on the current page (sheet) is completed.

When the comparison of all the lines is completed (yes in step #36), the controller 1 determines that an abnormality does not occur in the sheet corresponding to the comparison target image data 8b (step #37). Then, the controller 1 completes the present flow (end).

When the comparison of all the lines is not completed (no in step #36), the controller 1 compares the reference line data of the subsequent column (front line) and the distinguishment line data of the subsequent column in the comparison target image data 8b (step #38). The controller 1 continues to check the line data which is not compared. The controller 1 compares the pixel values of pixels in the same positions in the reference line data and the distinguishment line data of each line. The comparison here is also an equivalent logical operation. Then, the flow returns to step #32.

The controller 1 checks the pixel value of the m-th pixel in the line data of the n-th column in the sub scanning direction and the pixel value of the m-th pixel in the line data of the n-th column in the sub scanning direction in the region classification image data 8 (the comparison target image data 8b) of any page (page which is compared) subsequent to the second sheet.

When the continued number in the abnormal line data exceeds the second allowable value TH2 (yes in step #35), the controller 1 determines that an abnormality occurs in the sheet corresponding to the comparison target image data 8b (step #39). The second allowable value TH2 is used, and thus even when the sheet is displaced in position, is skewed or is folded so as not to cause a problem in the printing, it is possible to prevent a determination from being made that an abnormality occurs in the sheet.

When the controller 1 determines that an abnormality occurs in the sheet, the controller 1 stops the paper feed, the transport of the sheet, the image formation and the reading (step #310). The controller 1 displays, on the display panel 31, an image based on the reference image data 8a and an image based on the region classification image data 8 (the comparison target image data 8b) on which it is determined that an abnormality occurs (step #311). The controller 1 completes the present flow (end). The steps #310 and #311 are the same as the steps #210 and #211. Hence, the description of the steps #310 and #311 will be omitted.

(Second Variation)

An example of the determination of an abnormality in a sheet in a printer 100 according to a second variation will then be described. In the embodiment, the controller 1 makes a determination based on the image data of a line in the main scanning direction. In the first variation, the controller 1 makes a determination based on the image data of a line in the subscanning direction. In the second variation, the controller 1 makes a determination based on the image data of a line in the main scanning direction, and thereafter makes a determination based on the image data of a line in the subscanning direction.

The controller 1 makes a first determination as to whether or not the first sheet in the print job is different from any one of the second and subsequent sheets on which the reading is started. Based on the reference line data in the main scanning direction and the distinguishment line data of the comparison target image data 8b in the main scanning direction, the controller 1 makes the first determination.

When the controller 1 determines in the first determination that they are not different from each other, the controller 1 makes a second determination on the same sheet based on the reference line data in the subscanning direction and the distinguishment line data in the subscanning direction. The controller 1 makes a determination twice at the maximum on the second and subsequent sheets. Since a determination is made twice, it is possible to prevent a failure to detect (a failure to recognize) an abnormal sheet.

As described above, the image forming apparatus (printer 100) according to the embodiment and the variations includes the paper feeder 4a, the sheet transporter (first sheet transporter 5), the image former 6, the sheet reader 7, the storage medium 2 and the controller 1. The paper feeder 4a feeds the sheet. The sheet transporter transports the sheet supplied from the paper feeder 4a. The image former 6 prints the transported sheet. The sheet reader 7 is provided on the upstream side in the sheet transport direction with respect to the image former 6 so as to read the transported sheet. The storage medium 2 stores data. The sheet reader 7 reads the entire sheet transported. The controller 1 generates, based on the read image data which is image data of the sheet obtained by the reading of the sheet reader 7, the region classification image data 8 for distinguishing between a region of the sheet and a region other than the sheet in the read image data. The controller 1 stores, in the storage medium 2, the generated region classification image data 8. The controller 1 performs comparison processing in which the reference image data 8a that is the region classification image data 8 of the first sheet in the print job and the comparison target image data 8b that is the region classification image data 8 for comparison with the reference image data 8a are compared. The controller 1 sets the region classification image data 8 of each of the second and subsequent sheets in the print job to the comparison target image data 8b. The controller 1 determines, based on the comparison processing, whether or not the sheet corresponding to the comparison target image data 8b is abnormal for the first sheet in the print job. The controller 1 makes the sheet transporter stop the transport of the sheet such that the image former 6 is made to stop image formation when determining that the sheet corresponding to the comparison target image data 8b is abnormal.

It is possible to rapidly detect the start of the transport of the sheet different from the first sheet partway through the print job. In other words, it is possible to detect a mistake in setting the sheet in the paper feeder 4a. When it is determined that the sheet is different from the first sheet, it is possible to stop the transport of the sheet and the image formation. It is possible to prevent a large number of sheets which are not desired to be used from being used. It is possible to avoid useless printing. It is possible to avoid useless consumption of sheets, color materials, time and electric power. It is also possible to detect the displacement of the position of an abnormal sheet, the skewing thereof and the folding thereof. An abnormality in the transport of the sheet is detected, and thus it is possible to rapidly stop the printing operation.

The controller 1 compares the reference line data which is data of one line in the reference image data 8a and the distinguishment line data which is data of one line in the comparison target image data 8b. The controller 1 compares the pixel values of pixels in the same positions in the reference line data and the distinguishment line data. The controller 1 determines that the distinguishment line data in which pixels whose pixel values are different are continued so as to exceed the predetermined first allowable value TH1 is abnormal line data. The controller 1 sequentially switches the positions of the reference line data. The controller 1 determines, when the continued number in the abnormal line data exceeds the predetermined second allowable value TH2, that the sheet corresponding to the comparison target image data 8b is abnormal. The reference line data and the distinguishment line data are data of one line parallel to the predetermined reference direction. The distinguishment line data is data of one line in the same position as the reference line data.

The distinguishment line data which is significantly displaced from the first sheet can be determined to be the abnormal line data. When lines which are significantly displaced are continued so as not to be allowed, it is possible to determine that an abnormality occurs in the sheet corresponding to the region classification image data 8. Hence, a sheet which is significantly displaced from the first sheet can be determined to be abnormal. On the other hand, a sheet which is displaced from the first sheet and in which the displacement falls within an allowable range can be prevented from being determined to be abnormal. It is also possible to prevent a mistake in printing caused by a change in the skewing of the sheet, the folding of the sheet or the size of the sheet.

The reference direction is the main scanning direction or the subscanning direction. Based on line data in a certain direction, it is possible to determine whether or not an abnormality occurs in the sheet corresponding to the comparison target image data 8b.

In the second variation, based on the reference line data and the distinguishment line data in the main scanning direction, the controller 1 makes the first determination as to whether or not the sheet corresponding to the comparison target image data 8b is abnormal. When the controller 1 determines, in the first determination, that the sheet corresponding to the comparison target image data 8b is not abnormal, then based on the reference line data and the distinguishment line data in the subscanning direction, the controller 1 makes the second determination as to whether or not the sheet corresponding to the reference image data 8a and the comparison target image data 8b is abnormal. Both in the main scanning direction and in the subscanning direction, the reference image data 8a and the region classification image data 8 can be compared. It is possible to accurately determine whether or not the second and subsequent sheets are abnormal for the first sheet in the print job.

The image forming apparatus includes the display panel 31. When the controller 1 determines that the sheet corresponding to the comparison target image data 8b is abnormal, the controller 1 displays, on the display panel 31, an image based on the reference image data 8a and an image based on the region classification image data 8 which is determined to be different from the first sheet. It is possible to show a difference between the first sheet in the print job and the sheet which is determined to be abnormal.

Although the embodiment of the present disclosure is described, the scope of the present disclosure is not limited to this embodiment, and various modifications are possible without departing from the spirit of the disclosure.

What is claimed is:

1. An image forming apparatus comprising:
a paper feeder which feeds a sheet;
a sheet transporter which transports the sheet supplied from the paper feeder;
an image former which prints the transported sheet;
a sheet reader which is provided on an upstream side in a sheet transport direction with respect to the image former so as to read the transported sheet;
a storage medium which stores data; and
a controller,
wherein the sheet reader reads the entire sheet transported, and
the controller
generates, based on read image data which is image data of the sheet obtained by the reading of the sheet reader, region classification image data for distinguishing between a region of the sheet and a region other than the sheet in the read image data,
stores, in the storage medium, the generated region classification image data,
performs comparison processing in which reference image data that is the region classification image data of a first sheet in a print job and comparison target image data that is the region classification image data for comparison with the reference image data are compared,
sets the region classification image data of each of a second and subsequent sheets in the print job to the comparison target image data,
determines, based on the comparison processing, whether or not the sheet corresponding to the comparison target image data is abnormal for the first sheet in the print job and
makes the sheet transporter stop the transport of the sheet such that the image former is made to stop image formation when determining that the sheet corresponding to the comparison target image data is abnormal.

2. The image forming apparatus according to claim 1, wherein the controller
compares reference line data which is data of one line in the reference image data and distinguishment line data which is data of one line in the comparison target image data, compares pixel values of pixels in same positions in the reference line data and the distinguishment line data, determines that the distinguishment line data in which pixels whose pixel values are different are continued so as to exceed a predetermined first allowable value is abnormal line data, sequentially switches positions of the reference line data and determines, when a continued number in the abnormal line data exceeds a predetermined second allowable value, that the sheet corresponding to the comparison target image data is abnormal, the reference line data and the distinguishment line data are data of one line parallel to a predetermined reference direction and the distinguishment line data is data of one line in a same position as the reference line data.

3. The image forming apparatus according to claim 2, wherein the reference direction is a main scanning direction or a subscanning direction.

4. The image forming apparatus according to claim 2, wherein based on the reference line data in a main scanning direction and the distinguishment line data in the main scanning direction, the controller makes a first determination as to whether or not the sheet corresponding to the comparison target image data is abnormal, and when the controller determines, in the first determination, that the sheet corresponding to the comparison target image data is not abnormal, then based on the reference line data in a subscanning direction and the distinguishment line data in the subscanning direction, the controller makes a second determination as to whether or not the sheet corresponding to the reference image data and the comparison target image data is abnormal.

5. The image forming apparatus according to claim 1, comprising:

a display panel, wherein when the controller determines that the sheet corresponding to the comparison target image data is abnormal, the controller displays, on the display panel, an image based on the reference image data and an image based on the region classification mage data which is determined to be different from the first sheet.

6. The image forming apparatus according to claim 1, comprising:

a binarization processing circuit which performs binarization processing on the read image data, wherein the controller generates, as the region classification image data, image data obtained by binarizing the read image data with the binarization processing circuit.

7. The image forming apparatus according to claim 1, wherein the image former includes a plurality of line heads, and the line heads discharge an ink to the transported sheet so as to record an image.

8. A method of controlling an image forming apparatus, the method comprising:

feeding a sheet;

transporting the fed sheet;

using an image former so as to print the transported sheet;

providing a sheet reader which reads the transported sheet on an upstream side in a sheet transport direction with respect to the image former;

using the sheet reader so as to read the entire sheet transported;

generating, based on read image data which is image data of the sheet obtained by the reading of the sheet reader, region classification image data for distinguishing between a region of the sheet and a region other than the sheet in the read image data;

storing the generated region classification image data;

performing comparison processing in which reference image data that is the region classification image data of a first sheet in a print job and comparison target image data that is the region classification image data for comparison with the reference image data are compared;

setting the region classification image data of each of a second and subsequent sheets in the print job to the comparison target image data;

determining, based on the comparison processing, whether or not the sheet corresponding to the comparison target image data is abnormal for the first sheet in the print job; and stopping the transport of the sheet and image formation when it is determined that the sheet corresponding to the comparison target image data is abnormal.

* * * * *